April 7, 1942. C. G. PETERSEN 2,278,667
MILK SEDIMENT TESTER
Filed June 13, 1939
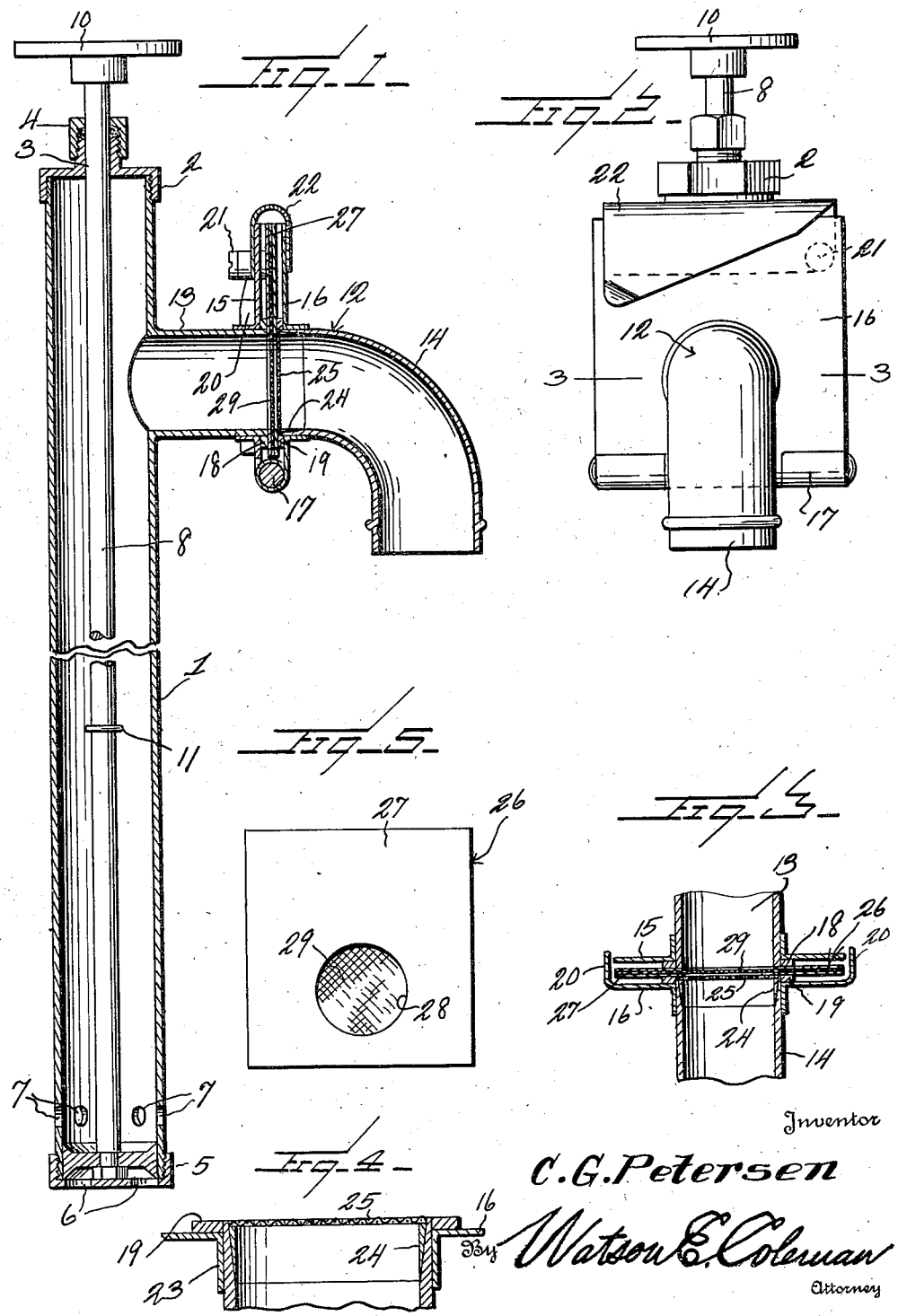
Inventor
C.G.Petersen
By Watson E. Coleman
Attorney Patented Apr. 7, 1942

2,278,667

UNITED STATES PATENT OFFICE 2,278,667

MILK SEDIMENT TESTER

Carl G. Petersen, Bismarck, N. Dak.

Application June 13, 1939, Serial No. 278,980

2 Claims. (Cl. 73—51)

This invention relates to milk sediment testers.

The present invention has for its primary object to provide a milk sediment tester which is designed so that a sediment test of milk may be made directly from the milk can, the milk weighing can or the milk vat whereby it is unnecessary to first remove from the can or vat a sample of the milk to be tested and to return such sample to the vat or can after the test has been made as is customary with the ordinary method of making tests.

Another object of the invention is to provide a milk sediment testing device by means of which a quick test may be made of a prescribed quantity of milk without removing the milk from the can or vat other than to raise the prescribed quantity from the vat through the tester and immediately return it to the vat, thereby eliminating the waste of milk which is incident to the present practice of taking out a quantity of milk from the vat or can in a separate receptacle, then passing the removed milk through the testing device into another receptacle and then returning the milk to the vat.

Still another object of the invention is to provide a milk sediment tester in the form of a pump, having associated therewith means for supporting a sediment disk in a position with respect to the pump whereby the milk when raised by the pump from the can or vat will be forced through the disk and will pass directly back into the vat, the disk being supported by the pump in such a manner that it may be easily and quickly placed in working position or removed therefrom.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 shows the milk sediment tester embodying the present invention in longitudinal section.

Fig. 2 is a view in front elevation of the upper portion of the tester.

Fig. 3 is a sectional view on the line 3—3 of Fig. 2.

Fig. 4 is a sectional view taken on an enlarged scale through the strainer unit which is supported at one side of the sediment disk.

Fig. 5 is a view in elevation of the sediment disk used in connection with the tester.

Referring now more particularly to the drawing, the numeral 1 designates the barrel or cylinder portion of the present tester, the upper end of which is closed by a cap 2 having a central passage 3 therethrough, which passage leads through a packing gland 4. The lower end of the cylinder is closed by a removable cap 5 which has a series of apertures 6 therein. Closely adjacent the cap 5, the wall of the cylinder 1 is provided with the circumferentially extending series of fluid inlet apertures 7.

Extending through the gland 4 is a piston rod 8 which is of sufficient length to extend entirely through the cylinder 1 and which carries upon its inner end the piston head or plunger 9 which is of solid form and closely contacts the wall of the cylinder. This plunger or head when fully extended to the lower end of the cylinder lies beneath the series of inlet apertures 7.

Upon its upper end the rod carries a head 10 by means of which its reciprocation in the cylinder is facilitated.

The plunger rod 8 carries a stop member 11 which may be in the form of a ring as shown, or of any other suitable form so long as it is attached to the rod in a manner to limit the upward movement of the same. The function of this stop member or ring 11 will be hereinafter more specifically described. Adjacent the upper end of the cylinder is a discharge nozzle which is generally indicated by the numeral 12 and which comprises an inner straight portion 13 which opens into the cylinder and an outer bent or downwardly curved portion 14, the outlet end of which is directed longitudinally of the cylinder and in the direction of the lower end of the same. These two nozzle portions are operatively coupled together through the medium of a pair of plates 15 and 16 which are here shown as being of rectangular design and hingedly coupled together by the hinge connection 17. The plate 15 has a central aperture through which the outer end of the nozzle portion 13 passes as is clearly shown in Fig. 3, this being what may be referred to as the inner plate of the pair and surrounding the end of the portion 13 which extends through the inner plate 15 is a ring 18 which is secured to the adjacent nozzle portion and to the outer face of the plate 15.

The other or outer plate 16 has the inner end of the nozzle portion 14 extended therethrough, as shown in Fig. 3, and this inner end of the nozzle portion 14 is encircled by a ring 19 which is secured to the nozzle portion and to the inner face of the plate 19. These rings 18 and 19 constitute clamp rings between which is secured the sediment disk hereinafter described. The outer plate 16 has each side edge turned to form an inwardly extending flange 20 and the inner plate 15 is located between these flanges when the two plates 15 and 16 are in parallel or closed relation to hold the sediment disk in position. These two plates together with the rings 18 and 19 function as a carrier for the sediment disk to support the latter coaxially between the alined adjacent ends of the nozzle portions 13 and 14.

In order that the sediment disk holding plates 15 and 16 may be securely clamped together, there is provided on the inner plate 15, a pivot stud 21 on which is pivotally supported a friction clasp 22 which, as shown in Fig. 1, is substantially U-shaped in cross-section and which extends throughout the major portion of the length of the top edges of the plates 15 and 16 to frictionally secure the top edges of these plates together in the manner shown.

The inner end of the nozzle portion 14 has a slight inside taper as shown at 23 in Fig. 4, and fitting in this tapered portion is an exteriorly tapered ring 24 which has secured across one end a fine mesh screen 25. The ring 24 is removably held in the taper 23 of the outer portion of the nozzle and when in position supports the screen 25 flush with the inner side of the clamping ring 19.

The numeral 26 generally designates the sediment card which is secured between the plates 15 and 16. This card comprises two main portions which are a flat rectangular body 27 of cardboard or similar material having an aperture 28 formed therethrough and a sheet of gauze 29 which is secured to the card 27 over the aperture 28. The body 27 may be in two sections between which the gauze 29 is held, the latter being drawn tightly over the opening so that it will not yield when fluid is forced therethrough.

The sediment card is placed between the plates 15 and 16, resting at its lower edge upon the hinge 17, as shown in Fig. 1, and when so positioned, the aperture 28 will be alined with the adjacent ends of the portions 13 and 14 of the nozzle. The clamping rings 18 and 19 will be secured together in encircling relation with the aperture 28 and will firmly grip the body 27 between them so that the leakage of fluid between the card and the adjacent portions of the nozzle will be prevented.

In the use of the present device, when a sediment card has been placed in the nozzle in the manner stated, the plunger 9 is shifted to the bottom end of the cylinder 1 and the cylinder is then inserted into a can or vat of milk to be tested. After waiting a short while to permit the milk to rise in the cylinder, the operator draws upwardly on the rod 8 until its upward movement is stopped by the stop member 11 striking the cap 2. This upward movement of the plunger will raise a predetermined quantity of milk from the milk container and discharge it through the nozzle 12, forcing the milk through the gauze or pad 29 of the tester. It will be understood, of course, that the device will always be used in vats or cans filled to the same depth so that it will thus be possible to locate the stop member 11 on the plunger rod so that after the plunger has been raised a predetermined distance, a known quantity of milk will be forced through the sediment disk. If the stop 11 is so set that when the cylinder is inserted into a filled milk can and the plunger raised, a half pint of milk will be forced out, it will be readily seen that any quantity test may be made. One operation of the plunger will give a test for a half of pint of milk and by repeating this operation one or three times or more, a test can be made for the amount of sediment in a pint or quart of milk or a greater quantity as may be desired.

What is claimed is:

1. The combination with a pump including a cylinder having an inlet adjacent one end and an outlet adjacent its other end, of a nozzle coupled with said outlet and divided transversely into an inner portion and an outer portion, a plate integral with and extending across the adjacent ends of said portions, the plates having apertures alined with the adjacent portions, hinge means coupling two adjacent edges of the plates together whereby the outer portion of the nozzle and the plate attached thereto may be shifted relative to the inner portion of the nozzle and the plate attached thereto to bring the plates into side by side relation and the nozzle portions into alinement, said plates being designed to have a sediment disk disposed therebetween, a clamping ring carried by each plate concentric with the aperture thereof and upon the face opposing the other plate, the sediment disk being secured between said rings, a locking means for securing said plates together in sediment disk clamping relation, one of said plates having angularly turned flanges along each of two opposite edges between which the other plate is received and said clamping means extending over and covering the edges of the plates opposite the pivotally connected edges whereby the pivotal connection between the edges, the flanges and the clamping means function to provide a casing within which the sediment disk is enclosed.

2. A milk sediment tester, compressing a cylinder, a solid plunger slidable in said cylinder, a rod connected with the plunger for effecting its reciprocation in the cylinder, said cylinder having fluid inlets spaced apart longitudinally thereof and adjacent an end thereof between which the plunger is adapted to position, a discharge nozzle adjacent the other end of the cylinder, said nozzle being formed to receive and support a sediment disk transversely thereof, and means carried by the rod for limiting movement of the plunger from between the apertures toward the nozzle to effect the discharge from the nozzle of a prescribed quantity of milk.

CARL G. PETERSEN.